(12) United States Patent
Li et al.

(10) Patent No.: US 8,451,836 B2
(45) Date of Patent: May 28, 2013

(54) METHOD, DEVICE, AND SYSTEM FOR TRANSMITTING CONSTANT RATE DATA STREAM

(75) Inventors: Kin Li, Chengdu (CN); Jianlin Zhou, Shenzhen (CN); Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 13/046,507

(22) Filed: Mar. 11, 2011

(65) Prior Publication Data

US 2011/0164877 A1 Jul. 7, 2011

Related U.S. Application Data

(63) Continuation of application No. PCT/CN2009/073851, filed on Sep. 10, 2009.

(30) Foreign Application Priority Data

Sep. 12, 2008 (CN) .......................... 2008 1 0149580

(51) Int. Cl.
*H04L 12/28* (2006.01)

(52) U.S. Cl.
USPC ................. 370/389; 370/395.61; 370/395.62; 370/476; 398/66; 398/155

(58) Field of Classification Search
None
See application file for complete search history.

(56) References Cited

U.S. PATENT DOCUMENTS

| | | | |
|---|---|---|---|
| 5,425,061 A * | 6/1995 | Laczko et al. ................. | 375/371 |
| 2002/0051465 A1 * | 5/2002 | Fang et al. .................... | 370/470 |
| 2004/0218534 A1 | 11/2004 | Song et al. | |
| 2007/0211763 A1 | 9/2007 | Solomon et al. | |
| 2008/0075220 A1 * | 3/2008 | Honken et al. ................ | 375/376 |

FOREIGN PATENT DOCUMENTS

| | | |
|---|---|---|
| CN | 1713556 A | 12/2005 |
| CN | 1852087 A | 10/2006 |
| CN | 1859063 A | 11/2006 |
| CN | 101039156 A | 9/2007 |
| CN | 101150876 A | 3/2008 |
| CN | 101166062 A | 4/2008 |

OTHER PUBLICATIONS

International Search Report issued in corresponding PCT Patent Application No. PCT/CN2009/073851, mailed Dec. 17, 2009.

(Continued)

*Primary Examiner* — Ayaz Sheikh
*Assistant Examiner* — Nicholas Sloms
(74) *Attorney, Agent, or Firm* — Brinks Hofer Gilson & Lione

(57) ABSTRACT

In the field of optical network communication technologies, a method, a device, and a system for transmitting a constant rate data stream are provided. The method for transmitting the constant rate data stream by the first network device includes: receiving a constant rate data stream; calculating an input rate of the constant rate data stream or a rate difference between the input rate and a standard rate of the constant rate data stream in each cycle of a reference clock; encapsulating the constant rate data stream into a Gigabit-Passive Optical Network (GPON) Encapsulation Method (GEM) frame by using a bit as a minimum encapsulation unit; and encapsulating the GEM frame into a GPON Transmission Convergence Layer (GTC) frame, and sending the GTC frame to the second network device through a GPON network. Therefore, the technical solutions may be widely applied to the GPON network.

7 Claims, 8 Drawing Sheets

OTHER PUBLICATIONS

International Telecommunication Union, "Gigabit-capable Passive Optical Networks (G-PON): Transmission Convergence Layer Specification", ITU-T Recommendation G.984.3, Feb. 2004.

Written Opinion of the International Searching Authority issued in corresponding PCT Patent Application No. PCT/CN2009/073851, mailed Dec. 17, 2009.

\* cited by examiner

METHOD, DEVICE, AND SYSTEM FOR TRANSMITTING CONSTANT RATE DATA STREAM

CROSS-REFERENCE TO RELATED APPLICATIONS

This application is a continuation of International Application No. PCT/CN2009/073851, filed on Sep. 10, 2009, which claims priority to Chinese Patent Application No. 200810149580.5, filed on Sep. 12, 2008, both of which are hereby incorporated by reference in their entireties.

FIELD OF THE TECHNOLOGY

The present invention relates to the field of optical network communication technologies, and more particularly to a method, a device, and a system for transmitting a constant rate data stream.

BACKGROUND OF THE INVENTION

As a passive optical access technology using a point-to-multipoint topology structure, a Gigabit-Passive Optical Network (GPON) includes an Optical Line Terminal (OLT) installed in a central control station, a batch of Optical Network Units (ONUs) on subscriber sites, and an Optical Distribution Network (ODN). The OLT provides an interface between a network side and a core network for an access network, and is connected to the ONUs through the ODN. The ONUs provide interfaces of a subscriber side for the access network, so that various service streams such as voice, data and video are connected to the OLT through the ODN and are under centralized control of the OLT.

The telecommunication network is in a process of transiting towards packet-based transmission, but a service of transmitting a constant rate customer data stream is still an important profit-generating part of an operator, and the service of bearing the constant rate customer data stream through the GPON will exist for a long time. An existing procedure for transmitting the constant rate data stream (for example, a Time Division Multiple (TDM) data stream) through the GPON network includes the following steps:

In S1, the OLT (or the ONU) encapsulates the TDM data stream by using a variable-length GPON Encapsulation Method (GEM). The TDM data stream flows through a TDM buffer and is then encapsulated into a GEM frame. When an output rate and an input rate of the TDM buffer have a frequency offset, the length of the GEM frame varies with the frequency offset. A payload length indicator (PLI) field in a GEM frame header is used to indicate a payload length of the GEM frame, and the payload length is the number of valid bytes of the TDM data encapsulated by the GEM frame.

In S2, through GPON Transmission Convergence Layer (GTC) processing, the OLT (or the ONU) transmits the GEM frame to the ONU (or the OLT) through the GPON network.

In S3, the ONU (or the OLT) de-encapsulates the GTC frame to obtain the GEM frame, de-encapsulates the GEM frame to obtain the TDM data stream, puts the TDM data stream to a buffer, controls outputting of the TDM data stream by using a local clock, and adjusts an output frequency by determining a data amount in the buffer. If finding that the data amount in the buffer is continuously increased, the ONU increases the output frequency; and if finding that the data amount in the buffer is continuously decreased, the ONU decreases the output frequency, so as to ensure that the data is not lost.

In the implementation of the present invention, the inventor found that the prior art at least has the following problems:

Due to the GTC transmission system and Dynamic Bandwidth Assignment (DBA) technology in the GPON network, the arrival time of the GEM frame received by the ONU (or the OLT) is non-uniform, and the length change of the valid payload is great, so that the rate of outputting the data stream from the ONU (or the OLT) is inconsistent with the constant rate of inputting the TDM data to the OLT (or the ONU), that is, the data stream output from the ONU (or the OLT) cannot be consistent with the constant rate of inputting the constant rate data stream to the OLT (or the ONU) with a high quality. Specific reasons are described in the following.

In one aspect, because the TDM data stream is asynchronous with the GPON network, the TDM data stream can be transmitted in the GPON network before the data stream is encapsulated by the GEM frame. Because the output rate and the input rate of the TDM buffer have the frequency offset, when the GEM frame uses a fixed payload length for encapsulation, the sending rate of the GEM frame is different, and as a result, the rate of the GEM frame received by the ONU (or the OLT) is different; and when the GEM frame is sent by using a fixed rate, the payload length in the GEM frame is changed, the OLT (or the ONU) performs the encapsulation in bytes, and a minimum variation is 1 byte, and as a result, the length change of the valid payload of the GEM frame received by the ONU (or the OLT) is also at least 1 byte.

In other aspect, when the bandwidth utilization is improved by using the DBA technology, the time slot of the GEM frame in the GTC is not fixed, and the difference may approach one GTC frame, that is, 125 microseconds (μs), so that the arrival time of the GEM frame in the ONU (or the OLT) becomes more non-uniform.

Because the rate of the GEM frame received by the ONU (or the OLT) is non-uniform, and the length change of the valid payload is great, the ONU (or the OLT) requires a large buffer to adjust the output frequency of the TDM data stream, which increases the time delay of the TDM data stream.

SUMMARY OF THE INVENTION

Accordingly, the embodiments of the present invention provide a method, a device, and a system for transmitting a constant rate data stream, so as to solve a problem that a rate of outputting data stream from an ONU (or OLT) is inconsistent with a constant rate of inputting the constant rate data stream to the OLT (or ONU).

In order to achieve the above objectives, the present invention provides the following technical solutions.

In an embodiment, the present invention provides a method for transmitting a constant rate data stream, in which the constant rate data stream is input from a first network device, passes through a GPON, and is output from a second network device, the second network device is an ONU when the first network device is an OLT, and the second network device is an OLT when the first network device is an ONU. The method for transmitting the constant rate data stream by the first network device includes the following steps:

A constant rate data stream is received.

An input rate of the constant rate data stream or a rate difference between the input rate and a standard rate of the constant rate data stream is calculated in each cycle of a reference clock.

The constant rate data stream is encapsulated into a GEM frame by using a bit as a minimum encapsulation unit, in which the GEM frame carries rate information of the input rate or the rate difference, and a length range of a valid payload is fixed.

The GEM frame is encapsulated into a GTC frame, and the GTC frame is sent to the second network device through the GPON network.

In an embodiment, the present invention further provides a method for transmitting a constant rate data stream, in which the constant rate data stream is input from a first network device, passes through a GPON, and is output from a second network device, the second network device is an ONU when the first network device is an OLT, and the second network device is an OLT when the first network device is an ONU. The method for transmitting the constant rate data stream by the second network device includes the following steps:

A GTC frame is received, and the GTC frame is de-encapsulated to obtain a GEM frame.

A constant rate data stream is obtained by de-encapsulating the GEM frame, and rate information of the constant rate data stream is acquired.

An average input rate of inputting the constant rate data stream to the first network device is periodically calculated based on the rate information.

Outputting of the constant rate data stream is controlled according to the average input rate.

In an embodiment, the present invention further provides a first network device, which includes a first receiving unit, a first calculation unit, an encapsulation unit, and a first GTC processing unit.

The first receiving unit is configured to receive a constant rate data stream.

The first calculation unit is configured to calculate an input rate of the constant rate data stream received by the first receiving unit or a rate difference between the input rate and a standard rate of the constant rate data stream in each cycle of a reference clock.

The encapsulation unit is configured to encapsulate the constant rate data stream received by the first receiving unit into a GEM frame by using a bit as a minimum encapsulation unit, in which the GEM frame carries rate information of the input rate or the rate difference calculated by the first calculation unit, and a length range of a valid payload is fixed.

The first GTC processing unit is configured to encapsulate the GEM frame encapsulated by the encapsulation unit into a GTC frame, and send the GTC frame to a second network device through a GPON network.

In an embodiment, the present invention further provides a second network device, which includes a second GTC frame processing unit, a de-encapsulation unit, a second calculation unit, and a second sending unit.

The second GTC frame processing unit is configured to receive a GTC frame, and de-encapsulate the GTC frame to obtain a GEM frame.

The de-encapsulation unit is configured to de-encapsulate the GEM frame obtained by performing de-encapsulation by the second GTC frame processing unit to obtain a constant rate data stream, and acquire rate information of the constant rate data stream.

The second calculation unit is configured to periodically calculate an average input rate of inputting the constant rate data stream to a first network device, according to the rate information acquired by the de-encapsulation unit.

The second sending unit is configured to control outputting of the constant rate data stream according to the average input rate calculated by the second calculation unit.

In an embodiment, the present invention further provides a system for transmitting a constant rate data stream, in which the constant rate data stream is input from a first network device, passes through a GPON, and is output from a second network device, the second network device is an ONU when the first network device is an OLT, and the second network device is an OLT when the first network device is an ONU. The system includes the first network device and the second network device.

The first network device is configured to receive a constant rate data stream, calculate an input rate of the constant rate data stream or a rate difference between the input rate and a standard rate of the constant rate data stream in each cycle of a reference clock, encapsulate the constant rate data stream into a GEM frame by using a bit as a minimum encapsulation unit, encapsulate the GEM frame into a GTC frame, and send the GTC frame to the second network device through the GPON network, in which the GEM frame carries rate information of the input rate or the rate difference, and a length range of a valid payload is fixed.

The second network device is configured to receive the GTC frame sent by the first network device, de-encapsulate the GTC frame to obtain the GEM frame, de-encapsulate the GEM frame to obtain the constant rate data stream, and acquire rate information of the constant rate data stream, periodically calculate an average input rate of inputting the constant rate data stream to the first network device according to the rate information, and control outputting of the constant rate data stream according to the average input rate.

In the technical solutions according to the present invention, the valid data stream in the GEM frame transmitted by the first network device uses the bit as the minimum encapsulation unit, and the length range of the valid payload is fixed, so that the length variation range of the valid payload in the GEM frame received by the second network device is reduced; the second network device periodically calculates the average input rate of inputting the constant rate data stream to the first network device according to the rate information carried in the received GEM frame, and controls the outputting of the data stream according to the average input rate, so as to reduce the influence of non-uniform arrival time of the GEM frame on the outputting of the data stream performed by the second network device, so that the rate of outputting the constant rate data stream by the second network device is consistent with the constant rate of inputting the constant rate data stream to the first network device.

BRIEF DESCRIPTION OF THE DRAWINGS

To make the technical solution of the present invention clearer, the accompanying drawings for illustrating the embodiments of the present invention or the prior art are outlined below. Apparently, the accompanying drawings are for the exemplary purpose only, and person having ordinary skill in the art can derive other drawings from such accompanying drawings without any creative effort.

DETAILED DESCRIPTION OF THE EMBODIMENTS

The technical solution under the present invention is described below with reference to the accompanying drawings. Evidently, the embodiments described below are for the exemplary purpose only, without covering all embodiments of the present invention. Those skilled in the art can derive other embodiments from the embodiments given herein without making any creative effort, and all such embodiments are covered in the protection scope of the present invention.

In order to solve a problem in the prior art that a rate of outputting a data stream from an ONU (or OLT) is inconsistent with a constant rate of inputting the constant rate data stream to the OLT (or ONU), the present invention provides a method, a device, and a system for transmitting a constant rate data stream.

In order to make the advantages of the technical solutions of the present invention more comprehensible, the present invention is further described in detail below with reference to the accompanying drawings and embodiments.

Figure 1A:
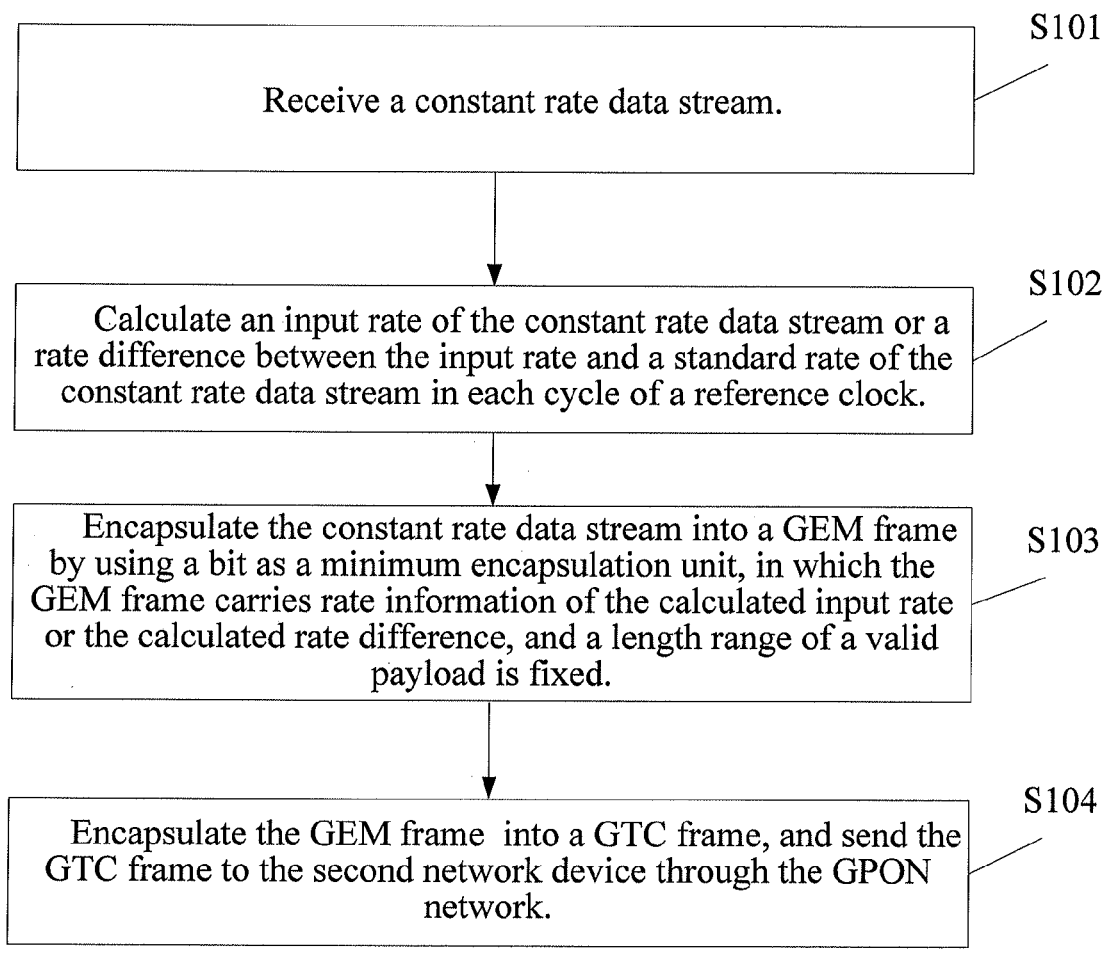
FIG. 1A is a schematic flow chart of a method for transmitting a constant rate data stream by a first network device according to an embodiment of the present invention.

In an embodiment, the present invention provides a method for transmitting a constant rate data stream, in which the constant rate data stream is input from a first network device, passes through a GPON, and is output from a second network device, the second network device is an ONU when the first network device is an OLT, and the second network device is an OLT when the first network device is an ONU. Referring to FIG. 1A, the method for transmitting the constant rate data stream by the first network device includes the following steps:

S101: Receive the constant rate data stream.

S102: Calculate an input rate of the constant rate data stream or a rate difference between the input rate and a standard rate of the constant rate data stream in each cycle of a reference clock.

S103: Encapsulate the constant rate data stream into a GEM frame by using a bit as a minimum encapsulation unit, in which the GEM frame carries rate information of the calculated input rate or the calculated rate difference, and a length range of a valid payload is fixed.

In this step, the first network device uses the bit as the minimum encapsulation unit, for example, may use 1 bit or more bits. In one aspect, the minimum encapsulation unit is selected according to the length of the reference clock, and the longer the length of the reference clock is, the larger the length range of the valid payload encapsulated into the GEM frame each time is. Therefore, the demand of the second network device may also be satisfied by appropriately increasing the minimum encapsulation unit, that is, by reducing the length variation range of the valid payload in the GEM frame received by the second network device. The constant rate data stream is, for example, E1, for description.

When the first network device performs the encapsulation process of the GEM frame by using 1 bit as the minimum encapsulation unit and 125 μs as the reference clock, the first network device may control the length range of the valid payload in each GEM frame to be from 255 to 257 bits.

When the first network device performs the encapsulation process of the GEM frame by using 250 μs as the reference clock and 2 bits as the minimum encapsulation unit, the first network device may control the length range of the valid payload in each GEM frame to be from 510 to 514 bits.

Effects of the preceding two manners of controlling the length range of the valid payload in the GEM frame are basically equivalent.

In another aspect, the minimum encapsulation unit is selected according to a transmission rate of the constant data stream, for example, when a data stream of a high rate of 622 Mbit/s or higher is transmitted, 2 bits may be used as the minimum encapsulation unit.

S104: Encapsulate the GEM frame into a GTC frame, and send the GTC frame to the second network device through the GPON network.

Figure 1B:
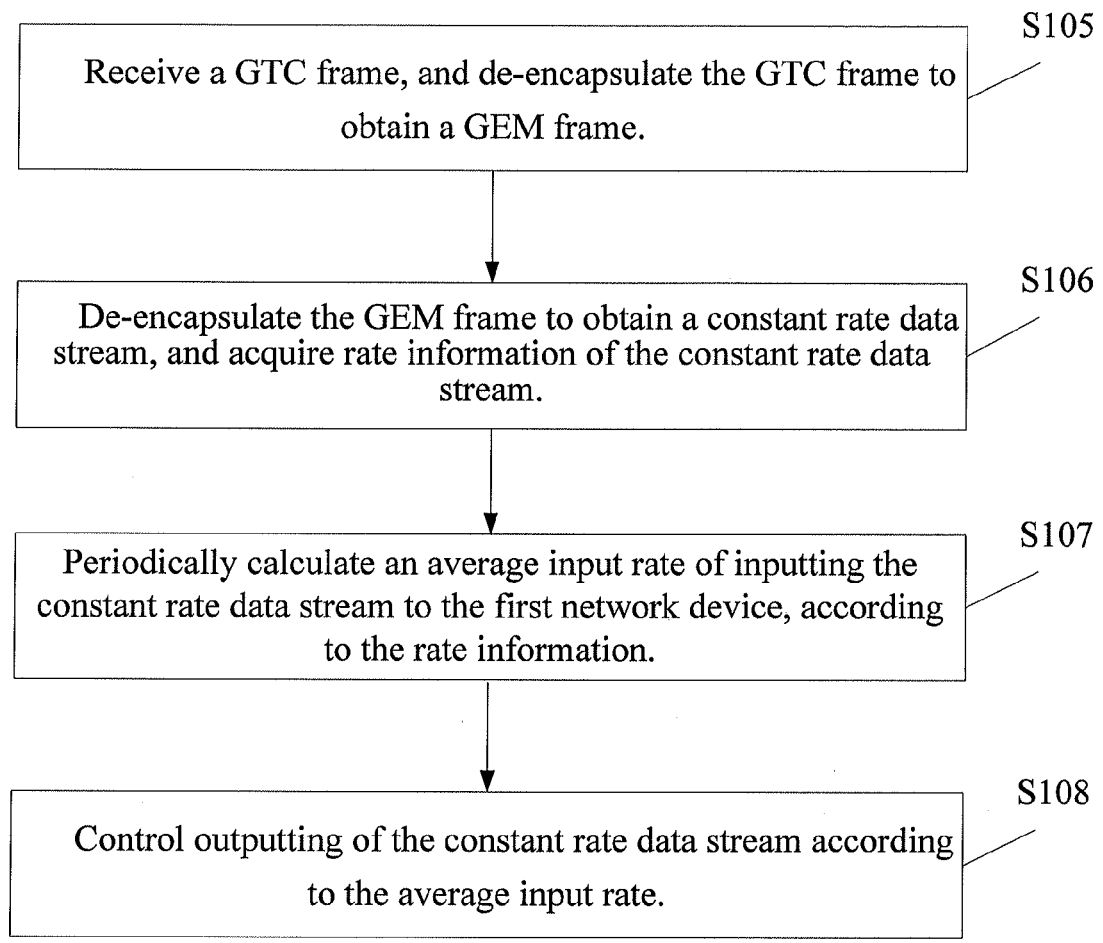
FIG. 1B is a schematic flow chart of a method for transmitting a constant rate data stream by a second network device.

Referring to FIG. 1B, the method for transmitting the constant rate data stream by the second network device includes the following steps:

S105: Receive a GTC frame, and de-encapsulate the GTC frame to obtain a GEM frame.

S106: De-encapsulate the GTC frame to obtain a constant rate data stream, and acquire rate information of the constant rate data stream.

S107: Periodically calculate an average input rate of inputting the constant rate data stream to the first network device according to the rate information.

S108: Control outputting of the constant rate data stream according to the average input rate.

In the clock-synchronized transmission method according to the embodiment of the present invention, the GEM frame transmitted by the first network device uses the bit as the minimum encapsulation unit, and the length range of the valid payload is fixed, so that the length variation range of the payload in the GEM frame received by the second network device is reduced; the second network device periodically calculates the average input rate of inputting the constant rate data stream to the first network device according to the rate information, and controls the outputting of the data stream according to the average input rate, so as to eliminate the influence of non-uniform arrival time of the GEM frame on the outputting of the data stream performed by the second network device, so that the rate of outputting the constant rate data stream by the second network device is consistent with the constant rate of inputting the constant rate data stream to the first network device.

First Embodiment

In the GPON network, a specific operational procedure for transmitting a constant rate data stream is described by taking downlink transmission of an E1 data stream of 2.048 Mbit/S±50 ppm from an OLT to an ONU.

Figure 2:
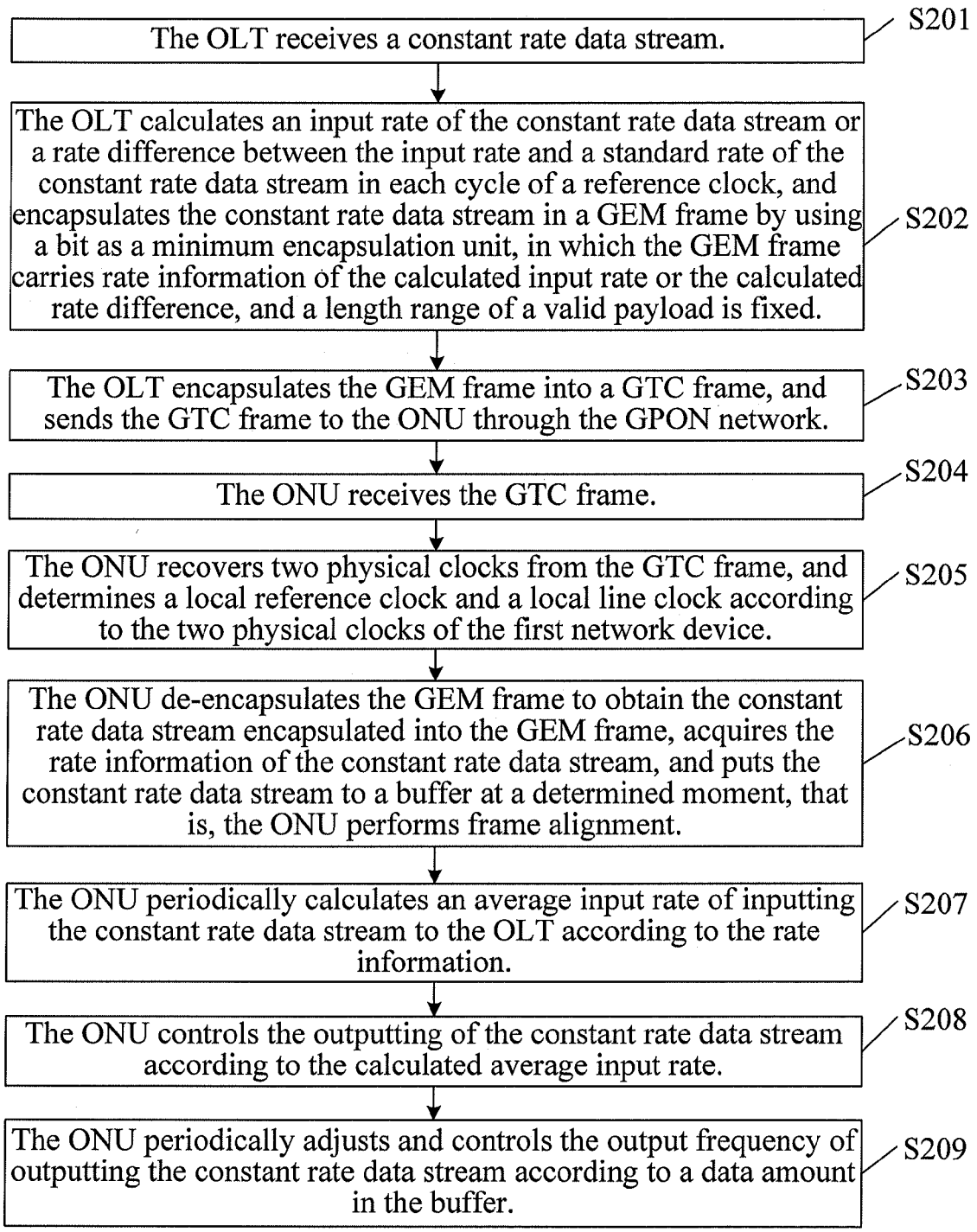
FIG. 2 is a flow chart of a first embodiment of a method for transmitting a constant rate data stream according to the present invention.

Referring to FIG. 2, the first network device is the OLT, and the second network device is the ONU, and the procedure includes the following steps:

S201: The OLT receives a constant rate data stream.

S202: The OLT calculates an input rate of the constant rate data stream or a rate difference between the input rate and a standard rate of the constant rate data stream in each cycle of a reference clock, and encapsulates the constant rate data stream in a GEM frame by using a bit as a minimum encapsulation unit, in which the GEM frame carries rate information of the calculated input rate or the calculated rate difference, and a length range of a valid payload is fixed.

Before this step, the OLT generates two physical clocks, in which one physical clock is used as the reference clock, and in this embodiment, a GTC physical clock of 8 KHz of the GPON is used as the reference clock, and TS=125 μs; and the other physical clock is used as a line clock of an optical carrier for transmitting the GTC frame, and in this embodiment, a multiple frequency clock of 155.52 MHz is used as the line clock.

Figure 3:
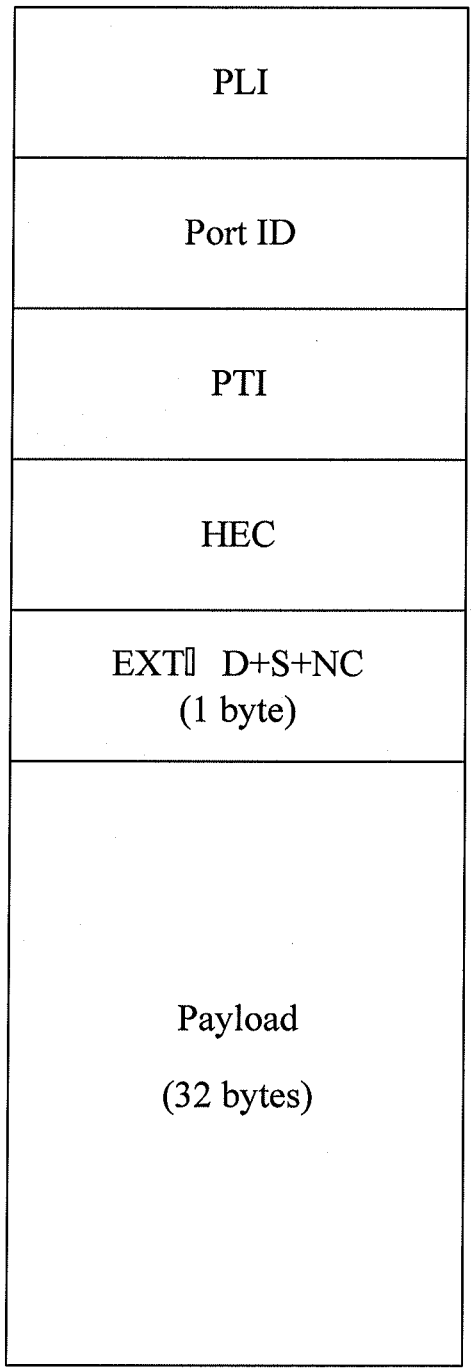
FIG. 3 is a schematic diagram of format definition of a GEM frame according to the first embodiment of the present invention.

Referring to FIG. 3, a format of the GEM frame includes a 5-byte frame header formed by a PLI, a port identifier (Port ID), a Payload Type Indicator (PTI), and a Header Error Correction (HEC), and an encapsulating payload. A payload length corresponding to E1 is 33 bytes, which includes an Ext field extending for 1 byte, and the payload length is used to transmit rate adjustment data and the rate information of the data stream. The Ext field includes rate adjustment data D, rate information S, and No Carry (NC) bit. The payload length further includes a valid payload Payload having a length of 32 bytes, which is used to encapsulate the constant rate data stream.

In this embodiment, the encapsulation of the GEM frame is performed by using 1 bit as the minimum encapsulation unit, and during the encapsulating procedure, the payload lengths of the GEM frames of data streams of different constant rates are different, so that the payload length may be determined according to Formula (1) in the following.

Payload length of GEM frame encapsulating the constant rate data stream=1 byte+standard rate of constant data stream*reference clock          Formula (1)

"+" indicates an addition operation, and "*" indicates a multiplication operation.

In the formula, 1 byte of the payload length of the GEM frame encapsulating the constant rate data stream is used to transmit the rate adjustment data and the rate information of the data stream.

The determined payload length PL is required to be capable of bearing the input constant rate data stream when the GPON physical clock is at a maximum frequency offset, and E1 is taken as an example for description.

The maximum frequency offset of E1 is ±50 ppm, the maximum frequency offset of the GPON physical clock is ±32 ppm, a maximum variation of the data stream in each reference clock is 1 bit, and S=±1 may be used to represent the difference value between the input rate and the standard rate of the E1 data stream. When the GPON is at −32 ppm, if PL=33 and S=1, the maximum input rate that can be borne by the OLT is (256+1)bit*(1/125 μs)*(1−32 ppm)≈2.0559 Mbit/S, and the frequency difference of the rate relative to the standard rate of E1 of 2.048 Mbit/S is greater than 3000 ppm, which can meet the requirement for the maximum frequency offset of E1 of ±50 ppm, so that a maximum variation range of the value of S is ±1, and the length PL can meet the requirement.

In S202, because the maximum frequency offset of the E1 data stream is 50 ppm, the maximum variation of the valid payload in one clock reference is 1 bit, which may be represented by the value of S, and the maximum variation range of the value of S is ±1. One clock reference cycle is corresponding to one GEM frame, and the OLT counts the number of bits of the E1 data stream input in the TS, and compares the number of bits with 256 bits when the E1 is at the standard rate. When the counted number is greater than 256, the value of S is +1; when the counted number is equal to 256, the value of S is 0; and when the counted number is less than 256, the value of S is −1.

During the encapsulating procedure, the OLT encapsulates the GEM frame by using the bit as the minimum encapsulation unit in the following three situations.

In a first situation, when the input rate of inputting the constant rate data stream to the OLT is greater than the standard rate, a rate adjustment bit encapsulated into the GEM frame is valid data of the constant rate data stream, in which the data encapsulated by the rate adjustment bit is the rate adjustment data D as shown in FIG. 3, and the definition of the subsequent rate adjustment bit is similar, so that the details are not described herein again.

In a second situation, when the input rate of inputting the constant rate data stream to the OLT is equal to the standard rate, the rate adjustment bit encapsulated into the GEM frame is invalid data.

In a third situation, when the input rate of inputting the constant rate data stream to the OLT is less than the standard rate, the rate adjustment bit encapsulated into the GEM frame and a set bit of the constant rate data stream are invalid data (when S is +1 and 0, the data of the set bit is valid data). In this embodiment, the position of the set bit may be preset to the last bit of the last byte of the encapsulated constant data stream or a better position (when the OLT uses 2 bits or more bits as the minimum encapsulation unit, the number of the bits at set positions and the number of the rate adjustment bits may be correspondingly adjusted).

In this embodiment, the OLT encapsulates the GEM frame by using 1 bit as the minimum encapsulation unit, and the length range of the valid payload of the GEM frame is fixed between 255 bits and 257 bits. As compared with the existing minimum encapsulation unit that is one byte, the length variation range of the valid payload in the GEM frame received by the ONU is reduced.

During the encapsulating procedure, the value of the rate information S in Ext is quite important for controlling the outputting of the data stream performed by the ONU, so that in order to ensure that the value of S is correctly transmitted, 1 byte (the byte for encapsulating the information in the Ext field) of the payload length of the GEM frame may carry three pieces of rate information of the constant rate data stream, so as to enable the ONU to make a majority decision.

6 bits are defined in the Ext field to transmit the value of S, in which every 2 bits transmit a value of S, for example, 01 represents that S=+1, 10 represents that S=−1, and 00 and 11 represent that S=0. One GEM frame may carry 3 values of S for transmission, and the ONU determines the value of S by using the majority decision method. Plus and minus symbols of the values of S may be transmitted by using the method, for example, 01 represents +, 10 represents −, and 00 and 11 represent that S=0. When the ONU makes the majority decision, if at least 2 plus symbols exist in the Ext field, it represents that S=+1; and if at least 2 minus symbols exist in the Ext field, it represents that S=−1, otherwise, it represents that S=0.

In this embodiment, the length range of the GEM frame encapsulating the E1 data stream is from 255 to 257 bits. In a situation that the length range of the valid payload in the GEM frame is fixed, after the payload length is calculated by using the Formula (1), the calculated payload length may be increased or decreased by several bytes according to the situation, or different payload lengths may be used according to odd frames or even frames, and the final payload length is represented by the PLI of the GEM frame header. For example, the payload length is 34 bytes, in which 2 bytes are used to transmit the rate information (the value of the input rate of inputting the data stream to the OLT may be directly transmitted) and the rate adjustment data, and are padded by padding data.

S203: The OLT encapsulates the GEM frame into a GTC frame, and sends the GTC frame to the ONU through the GPON network.

S204: The ONU receives the GTC frame.

S205: The ONU recovers two physical clocks from the GTC frame, and determines a local reference clock and a local line clock according to the two physical clocks of the first network device. Through the clock recovery, the ONU may ensure that elements received by the receiving end are sent in sequence. The reference clock of the OLT or the clock obtained after frequency division or multiplication is performed on the reference clock of the OLT is used as the reference clock of the ONU, so that the clock of the ONU is synchronized with the clock of the OLT, thereby facilitating the control of the ONU over the outputting of the data stream; and the line clock of the OLT after frequency division is used as the reference clock of the ONU for controlling the outputting of the constant rate data stream.

In a procedure for recovering the physical clock of 8 KHz, the ONU searches the GTC frame header from the received data stream, and sends one symbol signal having the same frequency as the GTC frame sent by the OLT when finding the GTC frame header 0xB6AB31E0, so as to obtain the GPON physical clock of 8 KHz.

The GTC frame header is defined as 0xB6AB31E0 of 4 bytes in ITU-T G.984.3, and the frequency of the GTC frame of 8 KHz is from a GTC frame cycle of 125 µs defined by ITU-T G984.3.

In a procedure for recovering the physical clock of 155.52 MHz, after photoelectric conversion is performed on an optical signal received by the ONU, the clock and the data are separated from a serial data stream, and 1:16 serial-to-parallel conversion is performed, so as to obtain the line clock of 155.52 MHz. In this embodiment, ⅛ frequency division is performed on the recovered line clock of 155.52 MHz to obtain 19.44 MHz for use as the reference clock of the output frequency of the data stream of the ONU.

S206: The ONU de-encapsulates the GEM frame to obtain the constant rate data stream encapsulated into the GEM frame, acquires the rate information of the constant rate data stream, and puts the constant rate data stream to a buffer at a determined moment, that is, the ONU performs frame alignment. For example, the ONU may put the constant rate data stream obtained by de-encapsulating the GEM frame to the buffer at every 125 µs, and when de-encapsulating the GTC frame to obtain a GEM frame at 200 µs, the ONU puts the data stream obtained by de-encapsulating the GEM frame to the buffer when a next determined moment at which the data stream is put to the buffer is reached, that is, at 250 µs, thereby facilitating the design and centralized processing of the ONU.

When the constant rate data stream is put to the buffer at the determined moment, the method further includes the following steps:

The ONU determines the rate information of the constant rate data stream, in which the ONU may determine the rate information by using the majority decision method.

When the rate information represents that the input rate of inputting the constant rate data stream to the OLT is greater than the standard rate, the rate adjustment data is put to the buffer at the determined moment.

When the rate information represents that the input rate of inputting the constant rate data stream to the OLT is less than the standard rate, the data of the set bit of the constant data stream put to the buffer is discarded (in which, the data of the rate adjustment bit is also discarded) at the determined moment. The position of the set bit in S202 is corresponding to the last bit of the last byte of the encapsulated constant data stream, and the ONU discards the last bit of the last byte of the constant data stream put to the buffer. By putting the constant rate data stream to the buffer through frame alignment, the ONU may correctly find the set position in the buffer, and process the information of the position according to the rate information.

When the rate information represents that the input rate of inputting the constant rate data stream to the OLT is equal to the standard rate, the rate adjustment data is discarded, and the data in the Payload obtained after de-encapsulation is directly put to the buffer without processing the data of the set bit of the constant rate data stream put to the buffer.

S207: The ONU periodically calculates an average input rate of inputting the constant rate data stream to the OLT according to the rate information.

Before this step, the ONU also needs to set a period for calculating the average input rate of inputting the constant rate data stream to the OLT, and a reference clock of the period is the recovered reference clock of the OLT or the clock obtained after frequency division or multiplication is performed on the reference clock of the OLT, for example, the period T may be set as 50 s. In a calculation method, statistics regarding the value of S in T are collected, and are converted into the rate of inputting the E1 data stream to the OLT.

S208: The ONU controls the outputting of the constant rate data stream according to the calculated average input rate.

The ONU converts the calculated average input rate of inputting the constant rate data stream to the OLT into an output frequency of sending the constant rate data stream according to the local line clock, and controls the outputting of the constant rate data stream through the output frequency.

For example, the ONU converts the calculated input rate of inputting the constant rate data stream to the OLT into a frequency control character of a frequency synthesizer according to the local line clock, outputs the frequency control character to the frequency synthesizer, and controls the outputting of the constant data system through an output frequency of the frequency synthesizer. The procedure may be implemented through Direct Digital Synthesis (DDS). The DDS is a new frequency synthesis technology that emerges with the rapid development of digital integrated circuits and computers. In the technology, the frequency synthesis is performed based on the concept of phase, the average input rate is converted into the frequency control character corresponding to the rate by using a corresponding calculation formula, and a frequency, a phase, an amplitude, a frequency control character, and other parameters of the local line clock are converted into a group of sampling functions by using a digital sampling technology, and then the required frequency signal is directly computed.

In this embodiment, the outputting of the constant rate data stream may also be controlled according to the calculated average input rate by using other manners, for example, by using a software or hardware technology, the required output frequency is obtained by querying a corresponding table preset in the frequency synthesizer or by calculation of a formula.

It should be noted that, before the first period for calculating the input rate of inputting the constant rate data stream to the OLT by the ONU is reached, the ONU may control the outputting of the constant rate data stream according to a default value/preset value of the system.

S209: The ONU periodically adjusts and controls the output frequency of outputting the constant rate data stream according to a data amount in the buffer.

Because a difference value may exist between an actual output frequency and a theoretical value (that is, the output frequency converted by the ONU according to the calculated rate value), an output frequency adjustment cycle $T_{adj}$ needs to be set to compensate for the difference value, so as to prevent the data amount in the buffer from being non-uniform due to unidirectional incrementing or decrementing of the data amount in the buffer. A reference clock of $T_{adj}$ is synchronous with the reference clock of the OLT, and is the reference clock of the OLT recovered from the GTC frame or the clock obtained after frequency division or multiplication is performed on the reference clock of the OLT. The length of $T_{adj}$ is correlated to the precision of the output frequency, and may be flexibly set according to user requirements. When $T_{adj}$ is reached, the following adjustment is performed.

When the first output frequency adjustment cycle is reached, a data amount N1 in the buffer is recorded.

When the subsequent output frequency adjustment cycle is reached, a current data amount N2 in the buffer is compared with the recorded data amount N1.

If the current data amount N2 is greater than the recorded data amount N1, the output frequency of the constant data stream is increased.

If the current data amount N2 is less than the recorded data amount N1, the output frequency of the constant data stream is decreased.

If the current data amount N2 is equal to the recorded data amount N1, the output frequency of the constant data stream remains unchanged.

The ONU may increase or decrease the output frequency of the constant data stream by increasing or decreasing the calculated input rate of inputting the constant rate data stream to the OLT. For example, when the rate of inputting the OLT to the E1 data stream is calculated, the rate is increased or decreased by 1 bit.

In this embodiment, the GEM frame encapsulated by the OLT uses the bit as the minimum encapsulation unit, and the length range of the valid payload in the GEM frame is fixed, so that the length variation range of the valid payload in the GEM frame received by the ONU is reduced; the rate information and the data stream are transmitted to the ONU at the same time, thereby reducing the time delay of the data stream; and the reference clock and the line clock of the ONU are synchronous with the reference clock and the line clock generated by the OLT, which facilitates design of the ONU. Therefore, the ONU periodically calculates the average input rate of inputting the constant rate data stream to the OLT according to the rate information in the de-encapsulated GEM frame, and controls the outputting of the data stream according to the average input rate, so as to eliminate the influence of non-uniform arrival time of the GEM frame on the outputting of the data stream performed by the ONU, so that the rate of outputting the constant rate data stream by the ONU is consistent with the constant rate of inputting the constant rate data stream to the OLT.

In this embodiment, the downlink transmission of the data stream is taken as an example for description, and when the data stream is transmitted from the ONU to the OLT, the first network device is the ONU, and the second network device is the OLT. The same processing method is used for uplink transmission, so that the details are not described herein again.

Second Embodiment

The constant rate data stream in the first embodiment is described by taking E1 as an example, and because constant data streams of different rates are corresponding to different payload lengths, the payload length may be calculated by using the Formula (1), and the payload length is required to be capable of bearing the data stream when the GPON physical clock is at the maximum frequency offset. The payload lengths PL of constant rate customer data streams of other rates in the case of the reference clock TS=125 µs is are as shown in Table 1.

TABLE 1

| Data Stream Type | Standard Rate | Nominal Length | Payload Length PL |
| --- | --- | --- | --- |
| T1 | 1.544 Mbit/s ± 50 bit/s | 193 bits | 194 bits |
| E1 | 2.048 Mbit/s ± 50 ppm | 256 bits | 257 bits |
| E3 | 34.368 Mbit/s ± 688 bit/s | 4296 bits | 4297 bits |
| DS3/T3 | 44.736 Mbit/s ± 895 bit/s | 5592 bits | 5593 bits |
| E4 | 139.264 Mbit/s ± 2089 bit/s | 17408 bits | 17409 bits |
| STM-1 regenerator | 155.52 Mbit/s ± 3111 bit/s | 19440 bits | 19441 bits |
| ... | ... | ... | ... |

For example, the constant rate customer data stream of 155.52 Mbit/S is transmitted through the GPON, in which the payload length PL is 1+155.520 M/8000=2431 bytes, and a specific transmission procedure is the same as the first embodiment, so that the details are not described herein again.

In the method for transmitting a constant data stream according to the present invention, after calculating the customer data stream, the first network device may automatically adapt to high quality transmission of the constant data stream of various rate levels through an adaptive method, for example, when the system is initialized, the default value/preset value of the payload length of the constant rate data stream according to the standard rates of various constant rate data streams, and after calculating the value of the input rate of any constant rate data stream, the first network device searches for the standard rate most approximate to the value of the input rate, further searches for the payload length corresponding to the standard rate, and encapsulates the received constant rate data stream by using the corresponding payload length. When the high rate data stream (622 Mbit/s or higher) is transmitted, with customer demand met, the first network device may appropriately adjust the minimum encapsulation unit for encapsulating the GEM frame, for example, use 2 bits or more bits as the minimum encapsulation unit, so as to control the length range of the valid payload in the GEM frame to be fixed, thereby expanding the application of the GPON.

Figure 4:
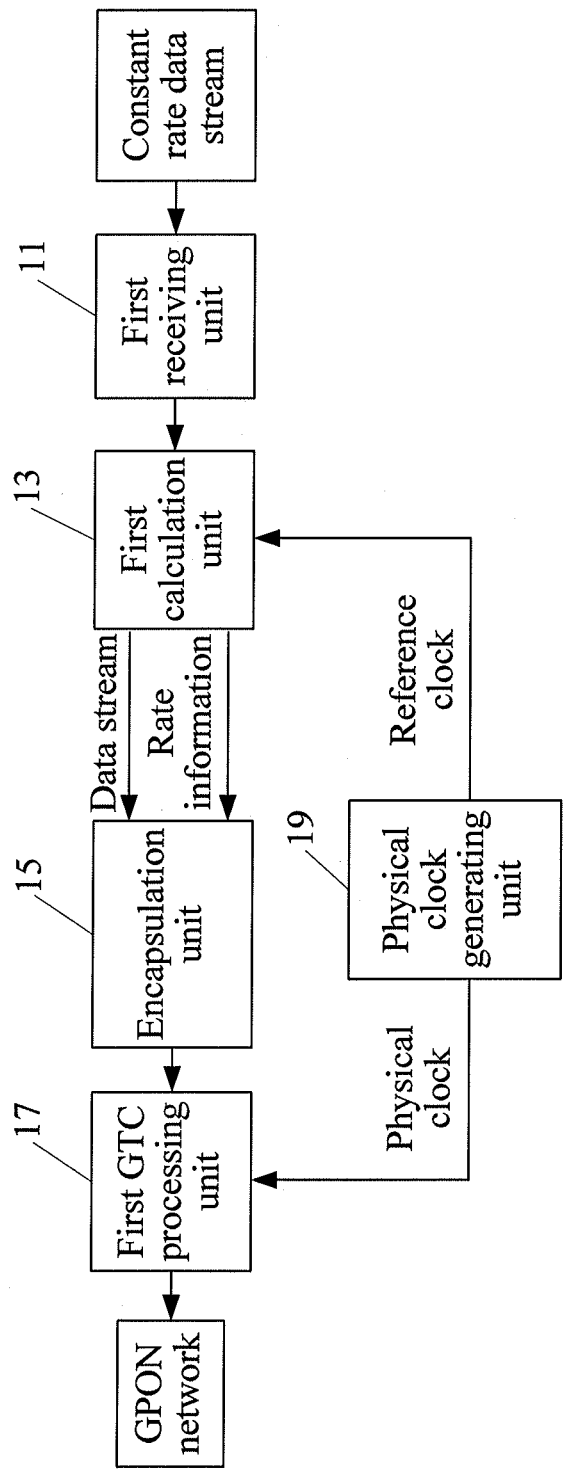
FIG. 4 is a schematic structural view of a first network device according to an embodiment of the present invention.

In an embodiment, the present invention further provides a first network device, capable of transmitting a constant rate data stream with a high quality. Referring to FIG. 4, the first network device includes a first receiving unit 11, a first calculation unit 13, an encapsulation unit 15, and a first GTC processing unit 17.

The first receiving unit 11 is configured to receive a constant rate data stream.

The first calculation unit 13 is configured to calculate an input rate of the constant rate data stream received by the first receiving unit 11 or a rate difference between the input rate and a standard rate of the constant rate data stream in each cycle of a reference clock.

The encapsulation unit 15 is configured to encapsulate the constant rate data stream received by the first receiving unit 11 into a GEM frame by using a bit as a minimum encapsulation unit, in which the GEM frame carries rate information of the input rate or the rate difference calculated by the first calculation unit 13, and a length range of a valid payload is fixed.

The first GTC processing unit 17 is configured to encapsulate the GEM frame encapsulated by the encapsulation unit 15 into a GTC frame, and send the GTC frame to a second network device through a GPON network.

The first network device according to the embodiment of the present invention carries the rate information when the constant rate data stream is input, so as to enable the second network device to control the outputting of the data stream. The GEM frame encapsulated by the first network device uses the bit as the minimum encapsulation unit, and the length range of the valid payload is controlled to be fixed, so that the length variation range of the valid payload in the GEM frame received by the second network device is reduced; and the rate information and the data stream are transmitted to the ONU at the same time, thereby reducing the time delay of the data stream.

Referring to FIG. 4, the first network device further includes a physical clock generating unit 19.

The physical clock generating unit 19 is configured to generate two physical clocks, in which one physical clock is used as the reference clock for calculating the input rate of the constant rate data stream by the first calculation unit 13, and the other physical clock is used as a line clock of an optical carrier for transmitting the GTC frame by the first GTC processing unit 17.

Therefore, the first network device according to the embodiment of the present invention can transmit the constant rate data stream with a high quality.

Figure 5:
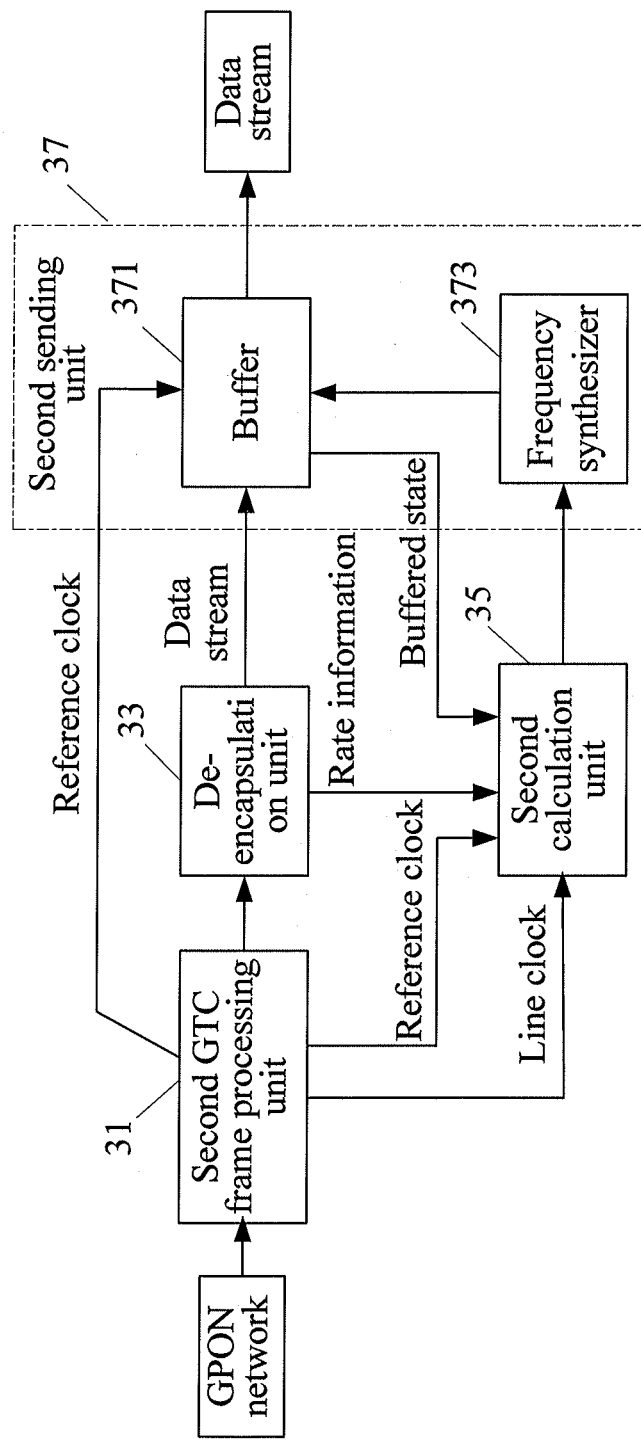
FIG. 5 is a schematic structural view of a second network device according to an embodiment of the present invention.

In an embodiment, the present invention further provides a second network device, capable of controlling outputting of a data stream with a high quality. Referring to FIG. 5, the second network includes a second GTC frame processing unit 31, a de-encapsulation unit 33, a second calculation unit 35, and a second sending unit 37.

The second GTC frame processing unit 31 is configured to receive a GTC frame, and de-encapsulate the GTC frame to obtain a GEM frame.

The de-encapsulation unit 33 is configured to de-encapsulate the GEM frame obtained by performing de-encapsulation by the second GTC frame processing unit 31 to obtain a constant rate data stream, and acquire rate information of the constant rate data stream.

The second calculation unit 35 is configured to periodically calculate an average input rate of inputting the constant rate data stream to a first network device, according to the rate information acquired by the de-encapsulation unit 33.

The second sending unit 37 is configured to control outputting of the constant rate data stream according to the average input rate calculated by the second calculation unit 35.

The second sending unit 37 includes a buffer 371 and a frequency synthesizer 373.

The buffer 371 is configured to buffer the constant rate data stream obtained by performing de-encapsulation by the de-encapsulation unit 33.

The frequency synthesizer 373 is configured to provide an output frequency according to the average input rate calculated by the second calculation unit 33, so as to control the outputting of the constant rate data stream in the buffer 371. For the frequency synthesizer, reference may be made to the relevant description of S208, so that the details are not described herein again. After the average input rate of inputting the constant data stream to the first network device is determined, the second sending unit 37 may also control the outputting of the constant rate data stream through other known manners.

The second network according to the embodiment of the present invention periodically calculates the input rate of inputting the constant rate data stream to the first network device according to the rate information, and controls the outputting of the data stream according to the input rate, so as to eliminate the influence of non-uniform arrival time of the GEM frame on the outputting of the data stream performed by the second network device, so that the rate of outputting the constant rate data stream by the second network device is consistent with the constant rate of inputting the constant rate data stream to the first network device.

The second GTC frame processing unit 31 may be further configured to recover two physical clocks of the first network device from the received GTC frame, and determine a reference clock and/or a line clock of the second calculation unit 35 according the two physical clocks of the first network device, so that the clocks of the ONU and the OLT are synchronized, thereby facilitating design of the ONU. In addition, the second calculation unit 35 may be further configured to increase or decrease the output frequency of sending the constant data stream by the second sending unit 37 by increasing or decreasing the calculated average input rate according to a data amount in the buffer 371, thereby compensating for the difference value between the actual output frequency and the theoretical value.

Therefore, the second network device according to the embodiment of present invention can control the outputting of the data stream with a high quality.

Figure 6:
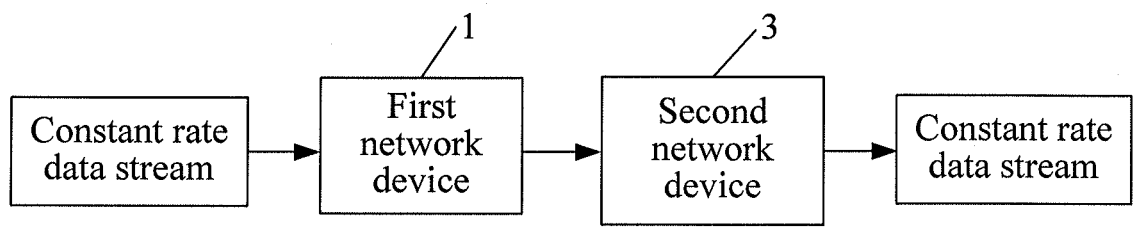
FIG. 6 is a schematic diagram of a system for transmitting a constant rate data stream according to an embodiment of the present invention.

In an embodiment, the present invention further provides a system for transmitting a constant rate data stream, so as to transmit the constant rate data stream with a high quality. Referring to FIG. 6, the constant data stream is input from a first network device 1, passes through a GPON, and is output from a second network device 3, when the first network device 1 is an OLT, the second network device 3 is an ONU, and when the first network device 1 is an ONU, the second network device 3 is an OLT. The system includes the first network device 1 and the second network device 3.

The first network device 1 is configured to receive a constant rate data stream, calculate an input rate of the constant rate data stream or a rate difference between the input rate and a standard rate of the constant rate data stream in each cycle of a reference clock, encapsulate the constant rate data stream into a GEM frame by using a bit as a minimum encapsulation unit, in which the GEM frame carries rate information of the input rate or the rate difference, and a length range of a valid payload is fixed, encapsulate the GEM frame into a GTC frame, and send the GTC frame to the second network device 3 through the GPON network.

The second network device 3 is configured to receive the GTC frame transmitted by the first network device, de-encapsulate the GTC frame to obtain the GEM frame, de-encapsulate the GEM frame to obtain the constant rate data stream, and acquire rate information of the constant rate data stream, periodically calculate an average input rate of inputting the constant rate data stream to the first network device 1 according to the rate information, and control outputting of the constant rate data stream according to the average input rate.

Figure 7:
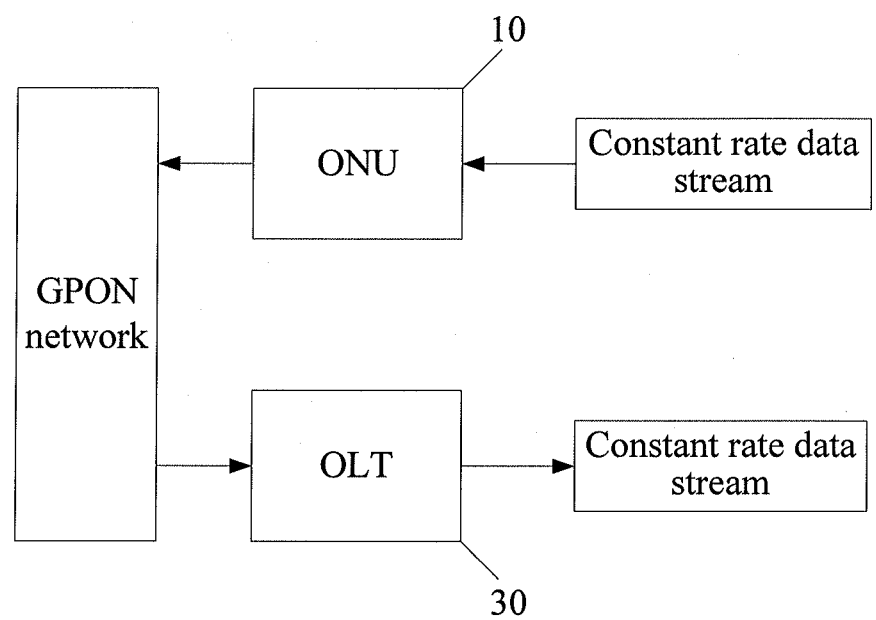
FIG. 7 is a schematic structural view of a system for transmitting a downlink constant rate data stream through a GPON network according to an embodiment of the present invention.
Figure 8:
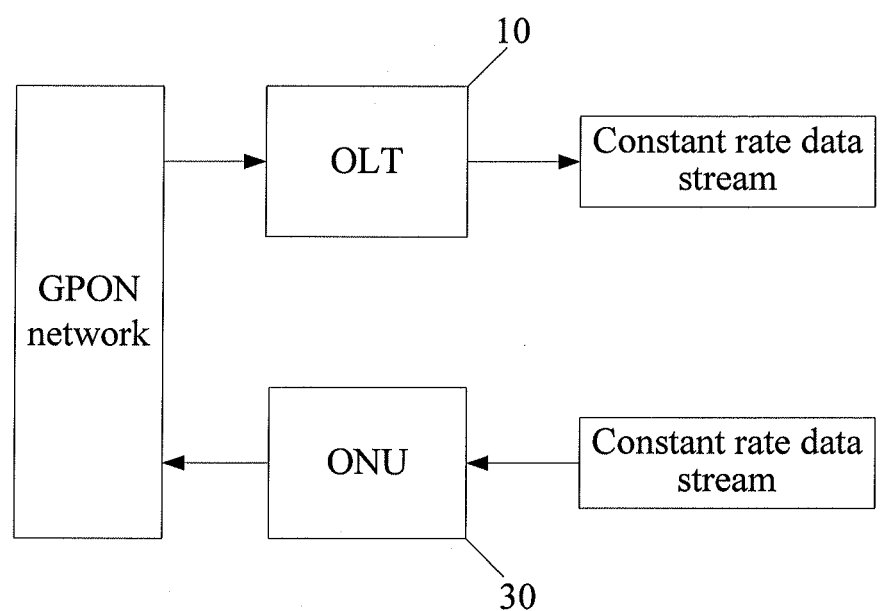
FIG. 8 is a schematic structural view of a system for transmitting an uplink constant rate data stream through a GPON network according to an embodiment of the present invention.

If the system is applied to the GPON network, referring to FIG. 7, when the second network device 3 is an ONU 10, the first network device 1 is an OLT 30; and referring to FIG. 8, when the second network device 3 is the OLT 30, the first network device 1 is the ONU 10.

In the system for transmitting a constant rate data stream according to the embodiment of the present invention, the first network device 1 transmits the GEM frame having the fixed length range of the valid payload by using the bit as the minimum encapsulation unit, so that the length variation range of the valid payload in the GEM frame received by the second network device 3 is reduced; the second network device 3 periodically calculates the input rate of inputting the constant rate data stream to the first network device 1 according to the rate information, and controls the outputting of the data stream according to the input rate, so as to eliminate the influence of non-uniform arrival time of the GEM frame on the outputting of the data stream performed by the second network device 3, so that the rate of outputting the constant rate data stream by the second network device 3 is consistent with the constant rate of inputting the constant rate data stream to the first network device 1. Therefore, the system may be widely applied to the GPON network.

Persons having ordinary skill in the art should understand that all or a part of the processes of the method according to the embodiments of the present invention may be implemented by a computer program instructing relevant hardware, Field Programmable Gates Array (FPGA), or Digital Signal Processing (DSP). The program may be stored in a computer readable storage medium. When the program is run, the steps of the method according to the embodiments of the present invention are performed. The storage medium may be a magnetic disk, a Compact Disk Read-Only Memory (CD-ROM), a Read-Only Memory (ROM) or a Random Access Memory (RAM).

In conclusion, the above are merely preferred embodiments of the present invention. However, the scope of the present invention is not limited thereto. Changes or replacements readily apparent to persons skilled in the prior art within the technical scope of the present invention should fall within the scope of the present invention. Therefore, the protection scope of the present invention is subject to the appended claims.

What is claimed is:

1. A method for transmitting a constant rate data stream in a Gigabit-Passive Optical Network (GPON), comprising:
   Receiving, in a first network device, a constant rate data stream;
   calculating an input rate of the constant rate data stream or a rate difference between the input rate and a standard rate of the constant rate data stream in each cycle of a reference clock;
   encapsulating the constant rate data stream into a GPON Encapsulation Method (GEM) frame by using a bit as a minimum encapsulation unit, wherein the GEM frame carries rate information of the input rate or the rate difference, and a length range of a valid payload is fixed; and
   encapsulating the GEM frame into a GPON Transmission Convergence Layer (GTC) frame, and sending, by the first network device, the GTC frame to a second network device through the GPON network,
   wherein the second network device is an Optical Network Unit (ONU) when the first network device is an Optical Line Terminal (OLT), and the second network device is an OLT when the first network device is an ONU;
   wherein before receiving the constant rate data stream, the method further comprises:
   generating two physical clocks, wherein one physical clock is used as the reference clock, and the other physical clock is used as a line clock of an optical carrier for transmitting the GTC frame;
   wherein encapsulating the constant rate data stream into the GEM frame by using the bit as the minimum encapsulation unit further comprises:
   calculating a payload length of the GEM frame encapsulating the constant rate data stream, according to the standard rate of the constant rate data stream and the cycle of the reference clock.

2. The method according to claim 1, wherein at least 1 byte of the payload length of the GEM frame encapsulating the constant rate data stream is used to transmit rate adjustment data and the rate information.

3. The method according to claim 2, wherein
   when the input rate of the constant rate data stream is greater than the standard rate, a rate adjustment bit encapsulated into the GEM frame is valid data of the constant rate data stream; or
   when the input rate of the constant rate data stream is equal to the standard rate, the rate adjustment bit encapsulated into the GEM frame is invalid data; and
   when the input rate of the constant rate data stream is less than the standard rate, the rate adjustment bit encapsulated into the GEM frame and a set bit of the constant rate data stream are invalid data.

4. The method according to claim 3, wherein the calculating the payload length of the GEM frame encapsulating the constant rate data stream, according to the standard rate of the constant rate data stream and the cycle of the reference clock comprises:
   the payload length of the GEM frame encapsulating the constant rate data stream=1 byte+ standard rate of constant data stream * reference clock,
   wherein "+" indicates an addition operation, and "*" indicates a multiplication operation.

5. A method for transmitting a constant rate data stream in a Gigabit-Passive Optical Network (GPON), comprising:
   receiving, in a second network device, a GPON Transmission Convergence Layer (GTC) frame, and de-encapsulating the GTC frame to obtain a GPON Encapsulation Method (GEM) frame;
   de-encapsulating the GEM frame to obtain a constant rate data stream, and acquiring rate information of the constant rate data stream;
   periodically calculating an average input rate of inputting the constant rate data stream to the first network device, according to the rate information; and
   controlling outputting of the constant rate data stream according to the average input rate,
   wherein the constant rate data stream is an input of a first network device, and is an output from the second network device, the second network device is an Optical Network Unit (ONU) when the first network device is an Optical Line Terminal (OLT), and the second network device is an OLT when the first network device is an ONU;
   wherein before the periodically calculating the average input rate of inputting the constant rate data stream to the first network device according to the rate information, the method further comprises:
   putting the constant rate data stream obtained by performing de-encapsulation to a buffer at a determined moment;
   wherein putting the constant rate data stream to the buffer at the determined moment further comprises:
   determining rate information of the constant rate data stream;
   putting rate adjustment data to the buffer at the determined moment, when the rate information represents that an input rate of the constant rate data stream input to the first network device is greater than a standard rate; or discarding data of a set bit of the constant rate data stream put in the buffer at the determined moment, when the rate information represents that the input rate of the constant rate data stream input to the first network device is less than the standard rate.

6. A method for transmitting a constant rate data stream in a Gigabit-Passive Optical Network (GPON), comprising:

receiving, in a second network device, a GPON Transmission Convergence Layer (GTC) frame, and de-encapsulating the GTC frame to obtain a GPON Encapsulation Method (GEM) frame;

de-encapsulating the GEM frame to obtain a constant rate data stream, and acquiring rate information of the constant rate data stream;

periodically calculating an average input rate of inputting the constant rate data stream to the first network device, according to the rate information; and controlling outputting of the constant rate data stream according to the average input rate, wherein the constant rate data stream is an input of a first network device, and is an output from the second network device, the second network device is an Optical Network Unit (ONU) when the first network device is an Optical Line Terminal (OLT), and the second network device is an OLT when the first network device is an ONU;

wherein controlling the outputting of the constant rate data stream according to the average input rate comprises:

converting the calculated average input rate of inputting the constant rate data stream to the first network device into an output frequency of sending the constant rate data stream, according to the local line clock, and controlling the outputting of the constant rate data stream;

further comprising:

increasing or decreasing the output frequency of sending the constant data stream by increasing or decreasing the calculated average input rate;

wherein the increasing or decreasing the output frequency of sending the constant data stream by increasing or decreasing the calculated average input rate comprises:

setting an output frequency adjustment cycle;

recording a data amount in a buffer, when a first output frequency adjustment cycle is reached;

comparing a current data amount in the buffer with the recorded data amount when a subsequent output frequency adjustment cycle is reached;

increasing the output frequency of sending the constant data stream, if the current data amount is greater than the recorded data amount; and decreasing the output frequency of sending the constant data stream, if the current data amount is less than the recorded data amount.

7. A second network device, comprising:

a Gigabit-Passive Optical Network (GPON) Transmission Convergence Layer (GTC) frame processing unit, configured to receive a GTC frame, and de-encapsulate the GTC frame to obtain a GPON Encapsulation Method (GEM) frame;

a de-encapsulation unit, configured to de-encapsulate the GEM frame obtained by performing de-encapsulation by the GTC frame processing unit to obtain a constant rate data stream, and acquire rate information of the constant rate data stream;

a calculation unit, configured to periodically calculate an average input rate of inputting the constant rate data stream to a first network device, according to the rate information acquired by the de-encapsulation unit; and a sending unit, configured to control outputting of the constant rate data stream according to the average input rate calculated by the calculation unit;

wherein the sending unit comprises:

a buffer, configured to buffer the constant rate data stream obtained by performing de-encapsulation by the de-encapsulation unit; and a frequency synthesizer, configured to provide an output frequency according to the average input rate calculated by the calculation unit, so as to control the outputting of the constant rate data stream in the buffer;

wherein the GTC frame processing unit is further configured to recover two physical clocks of the first network device from the received GTC frame, and determine at least one of a reference clock and a line clock of the calculation unit according the two physical clocks of the first network device; and the calculation unit is further configured to increase or decrease the output frequency of sending the constant data stream by the sending unit by increasing or decreasing the calculated average input rate according to a data amount in the buffer.

* * * * *

UNITED STATES PATENT AND TRADEMARK OFFICE
CERTIFICATE OF CORRECTION

PATENT NO. : 8,451,836 B2  
APPLICATION NO. : 13/046507  
DATED : May 28, 2013  
INVENTOR(S) : Kun Li et al.

Page 1 of 1

It is certified that error appears in the above-identified patent and that said Letters Patent is hereby corrected as shown below:

<u>On the Title Page</u>

Item [75], replace "Kin Li," with --Kun Li,--.

Signed and Sealed this  
Sixth Day of August, 2013

Teresa Stanek Rea  
*Acting Director of the United States Patent and Trademark Office*